United States Patent Office 3,522,283
Patented July 28, 1970

3,522,283
PRODUCTION OF π-ALLYL TRANSITION
METAL-ANION COMPOUNDS
Gunther Wilke, Mulheim (Ruhr), Germany, assignor to
Studiengesellschaft Kohle m.b.H., Mulheim (Ruhr),
Germany
No Drawing. Original applications Aug. 6, 1964, Ser. No.
387,990, Feb. 21, 1967, Ser. No. 617,461, and Aug. 25,
1967, Ser. No. 663,229. Divided and this application
Sept. 27, 1968, Ser. No. 763,360
Int. Cl. C07j 15/04
U.S. Cl. 260—439
14 Claims

ABSTRACT OF THE DISCLOSURE

Reaction of multiple olefin-transition metal complex with a H+X− in which X− is an anionic radical, whereby producing a π-allyl-transition metal-anion compound.

This application is a division of application Ser. No. 663,229 filed Aug. 25, 1967, now U.S. Pat. No. 3,432,530, issued Mar. 11, 1969; application Ser. No. 617,461, filed Feb. 21, 1967; and application Ser. No. 387,990, filed Aug. 6, 1964 now U.S. Pat. No. 3,424,777, issued Jan. 28, 1969.

This invention relates to the method of producing π-allyl transition metal anion compounds. It further refers to the product of such process.

π-allyl transition metal compounds were first made in 1959 by Smidt and Hafner, see Angewandte Chemie 71, 284 (1959). Further allyl metal compounds have been made by H. B. Jonassen, J. Amer. Chem. Soc. 80, 2586 (1958); R. Huttel u. J. Kratzer, Angew. Chem. 71, 456 (1959); I. I. Moiseev, E. A. Fedorowskaya u. Y. K. Syrkin, J. anorg. Chem. (Russ.) 4, 2641 (1959). These products generally contained additional ligands besides the π-allyl group therein.

Wilke and Bogdanovic showed, in Angewandte Chemie, vol. 73 (1961), p. 756, that it is possible to produce carbonyl-free bis-π-allyl nickel by the reaction of anhydrous nickel bromide and allyl magnesium chloride. Thus, for the first time there was prepared a π-allyl transition metal compound containing no other ligands than π-allyl groups.

Some π-allyl-Me-X compounds are already known. Thus E. O. Fischer and G. Burger (Z. Naturforsch. 16b, 77 (1961) Report 94, 2409 (1961)) have for the first time described the preparation of the π-allyl-nickel bromide from the extremely poisonous nickel carbonyl and allyl bromide. The yields were given as only 11% of theory. Also known is the conversion of butadiene-iron-tricarbonyl with anhydrous hydrogen chloride (F. J. Impastato and K. G. Ihrman, J. Am. Chem. Soc. 83, 3276 (1961)) which leads to the formation of a π-crotyl-iron-tricarbonyl-chloride.

However, these methods for the preparation of these compounds are unsatisfactory since the reaction products can be obtained only in low yields and since it is necessary to proceed for their production from the generally extremely poisonous metal carbonyls. A further disadvantage of these processes consists therein, that frequently not the pure compounds of the above named type are formed, but that complexes result in which still further substituents, such as for example CO-groups, are contained.

This invention then involves, as one of its aspects, the reaction of a complex of an exclusively multiple olefin with a transition metal of group IVb, Vb, VIb, and/or VIII of the Periodic Table with an acid to produce a π-allyl transition metal-anion compound.

The products produced by this reaction are useful as catalysts for the cyclooligomerization of 1-3-diolefins, particularly the cyclooligomerization of butadiene to produce cyclododecatriene.

As used herein, the Periodic Table which is referred to is that which is used by the International Union of Pure and Applied Chemistry.

The reaction in accordance with this invention proceeds from complexes of transition metals with exclusive multiple olefins by reacting these with an acid HX. The expression "exclusive multiple olefins" means hydrocarbon moieties which have olefinic unsaturation as the sole functional group or groups. Cyclooctatetraene-nickel-(O) is an example for a complex of a transition metal connected to a multi-ene cyclic structure producible, for example, according to my copending application, Ser. No. 532,900. Further complexes of transition metals with exclusive multiple olefins can be produced, for example, according to my copending applications Ser. No. 104,221 and Ser. No. 532,900. Thus, π-cyclooctatrienyl-nickel chloride can be produced by reaction of cyclooctatetraene-nickel-(O) with anhydrous hydrogen chloride according to the following equation (2)

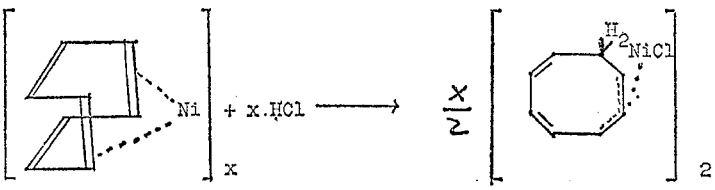

The X in HX signifies an anionic radical to which is bound hydrogen atom in the sense of the polarization H(+)X(−). Compounds of the type HX are preferably anhydrous hydrogen halides, though also other acid compounds, for example, organic acids and particularly carboxylic acids, for instance, acetic acid as well as phenols, thiophenols, mercaptans, hydrocyanic acid and 1,3-diketones (enol form) may be used.

The processes in accordance with the invention are advantageously carried out with solutions of the starting materials in solvents inert for the π-allyl metal compounds and the referred-to complexes, since the reactions proceed in solution precisely stoichiometrically. Suitable solvents are aliphatic or aromatic ethers, cyclic ethers, saturated or aromatic and halogenated hydrocarbons substantially inert to these compounds and complexes. The conversions are preferably carried out at temperatures of from −80° to +100° C.

In most cases the reaction products result at once in crystallized form. In some cases the reaction products are recrystallized from suitable solvent solutions.

All operations in the following examples were carried out under exclusion of air and humidity, i.e., under a protective gas, such as for example, argon or nitrogen, since the compounds producible in accordance with the invention are sensitive to air or humidity.

EXAMPLE 1

12.3 g. bis-cyclooctadiene-nickel-(O) are suspended in 100 cm.³ toluene and converted at 0° under stirring with 1070 cm.³ (at 20°) anhydrous hydrogen chloride. The solution at once becomes colored deep red, and at the walls of the reaction vessel forms a thin nickel surface. The red solution is evaporated and the residue recrystallized from methylene chloride. The red powder, which resulted in almost quantitative yield, corresponds to the composition $C_8H_{13}NiCl$. It is identified as a π-cyclooctenyl-nickelchloride.

Calculated 28.9%, found 28.0% Ni.

EXAMPLE 2

10.0 g.=36.4 mmol bis-cyclooctadiene-nickel-(O) are suspended in 50 cm.³ benzene, and converted at 20° with 2.0 cm.³ glacial acetic acid (2.1 g.=35 mmol). Within about 25 minutes the crystals dissolve and after further 20 minutes all volatile constituents are distilled off at 10⁻⁴ torr. The remaining red oil is dissolved in 50 cm.³ hexane. The solution is cooled to −70°, wherein red-brown crystals are separated.

Yield: 5.5 g.=67% of the theory of π-cyclooctenyl-nickelacetate:

$C_{10}H_{16}O_2Ni$—Calculated (percent): M.W., 226.7; Ni, 25.9. Found (percent): M.W., 363; Ni, 25.95.

EXAMPLE 3

11.2 g.=40.8 mmol bis-cyclooctadiene-nickel-(O) are suspended in 75 cm.³ toluene and converted at 20° with 4.5 cm.³ ethylmercaptan. The mixture is stirred for 4 hours and subsequently filtered over a G–4 frit. The filtrate is evaporated and the crystalline residue is recrystallized from a toluene-hexane mixture. The crystals correspond to the π-cyclooctenyl-nickel-ethyl-mercaptide of the composition $C_{10}H_{18}SNi$. The red-brown crystals showed the following analysis:

Calculated (percent): Ni, 25.70. Found (percent): Ni, 26.0.

Calculated (percent): M.W., 228.7 (as dimer 457.4). Found (percent): M.W., 462.

EXAMPLE 4

19.6 g.=71.3 mmol bis-cyclooctadiene-nickel-(O) are treated in 50 cm.³ benzene with 10 cm.³=97.7 mmol acetylacetone. The suspension is stirred for in all 4–5 days until all crystals have become dissolved. Subsequently all volatile constituents are distilled off at 10⁻¹ torr and maximally 40°. The residue is dissolved in 50 cm.³ hexane (about 50°) and then the solution is cooled to 0°. Obtained are 13–14 g. of red-brown crystals, which may be sublimated at 10⁻⁴ torr and 60°.

Yield: 75% of the theory of the π-cyclooctenyl-nickel-acetylacetonate.

$C_3H_{20}O_2Ni$—Calculated (percent): C, 58.50; H, 7.51; Ni, 22.0. Found (percent): C, 58.18; H, 7.97; Ni, 22.1.

EXAMPLE 5

6.44 g.=39.6 mmol cyclooctatetraene-nickel-(O) are converted in the course of 2 hours at 45–50° with 25 cm.³ pure glacial acetic acid. Subsequently all volatile constituents are distilled off in vacuum. The residue is recrystallized from 250 cm.³ toluene at 70°. Obtained are 5.3 g. =60% of the theory of red crystal needles of the π-cyclooctatrienylnickelacetate of the composition $C_{10}H_{12}O_2Ni$.

Calculated (percent): M.W., 222.8 (or respectively as dimer 445.5); Ni, 26.3. Found (percent): M.W., 494; Ni, 26.0.

EXAMPLE 6

2.05 g.=12.6 mmol cyclooctatetraene-nickel-(O) are heated for 5 hours in 25 cm.³ acetylacetone to 100°. One permits to cool and then filters the intensely red colored solution. The filtrate is evaporated at vacuum and the residue is dissolved in hot hexane. Obtained are 0.5 g. =15% of the theory of brown crystals of the π-cyclooctatrienylnickelacetonate of the composition $C_{13}H_{16}O_2Ni$.

Calculated (percent): Ni 22.3. Found (percent): Ni, 22.3.

Undissolved remain in hexane 1.2 g. nickel-acetylacetonate.

EXAMPLE 7

50.3=0.31 mmol cyclooctatetraene-nickel-(O) are suspended in 750 cm.³ toluene and at −80° converted slowly under shaking with 7.55 l. anhydrodus hydrogen chloride. One permits thawing to 20° and filters off the red suspension formed. From the mother liquors further constituents may be isolated. In all are obtained 46 g.=75% of the theory of reaction product of the composition $C_8H_9ClNi$, i.e., thus π-cyclooctatrienylnickel chloride.

Calculated (percent): Ni, 29.5; Cl, 17.85. Found (percent): Ni, 29.2; Cl, 18.15.

EXAMPLE 8

3 g.=13.7 mmol of the bis-π-allyl compound n—$C_{12}H_{18}Ni$ of the following structural formula

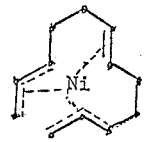

are reacted in 100 cc. ether with gaseous HCl at −40° C. Excess HCl as well as the ether are then removed in vacuum. The residue is dried in high vacuum at 20° C. There are obtained a red oil, the composition of which corresponds to the empirical formula $C_{12}H_{19}NiCl$ and the structure of which corresponds to the H¹-NMR-Spectrum as well as the IR-Spectrum of the following formula

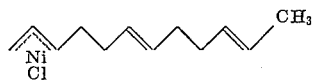

Calculated (percent): Ni, 22.8. Found (percent): Ni, 22.3.

The properties, activity and reactivity of the π-allyl metal compounds herein described are solely due to the π-allyl linkage and the particular stereo positioning of atoms thereby defined.

What is claimed is:
1. Method for the production of a π-allyl nickel-anion compound, which comprises reacting a complex of exclusively multiple olefins linked to nickel with an H⁺X⁻, in which X⁻ is an acidic anionic radical.
2. Method as claimed in claim 1, wherein said reaction is carried out in the presence of an inert protective gas.
3. Method as claimed in claim 1, wherein said reaction is carried out in liquid phase.
4. Method as claimed in claim 1, wherein the exclusive multiple olefin is a cyclic moiety.
5. Method as claimed in claim 1, wherein said anionic radical is a member selected from the group consisting of chloride, bromide and iodide.
6. Method as claimed in claim 1, carried out at about −80 to +100° C.
7. Method as claimed in claim 1, wherein said anionic radical is a member selected from the group consisting of acetate, acetylacetonate and mercaptide.
8. π-cyclooctenyl-nickelacetate.
9. π-cyclooctenyl-nickel-ethylmercaptide.
10. πcyclooctenyl-nickelacetylacetonate.
11. π-cyclooctatrienylnickel-acetate.
12. π-cyclooctatrienylnickel-acetylacetonate.
13. π-cyclooctatrienylnickel chloride.
14. Compound $C_{12}H_{19}NiCl$ of the structural formula

(References on following page)

References Cited

UNITED STATES PATENTS 3,080,305   3/1963   Gorsich _____ 204—158

OTHER REFERENCES

Chatt et al.: J. Chem. Soc., 1960, pp. 1718–21.

TOBIAS E. LEVOW, Primary Examiner

A. P. DEMERS, Assistant Examiner

U.S. Cl. X.R.

252—429, 431; 260—666

PO-1050
(5/69)

UNITED STATES PATENT OFFICE
CERTIFICATE OF CORRECTION

Patent No. 3522283            Dated July 28, 1970

Inventor(s) Gunther Wilke

It is certified that error appears in the above-identified patent and that said Letters Patent are hereby corrected as shown below:

<u>Column 2, line 42</u>     (Spec. p. 3, line 20)

before "hydrogen" insert --the--

<u>Column 3, line 51</u>     (Spec. p. 6, line 12)

Formula - "$C_3H_{20}O_2Ni$" should be --$C_{13}H_{20}O_2Ni$--

SIGNED AND
SEALED
NOV. 3, 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,522,283　　　　　　　　　　Dated　July 28, 1970

Inventor(s)　Gunther Wilke

It is certified that error appears in the above-identified patent and that said Letters Patent are hereby corrected as shown below:

Column 3, line 48, "$100^{-4}$" should read -- $10^{-4}$ --; lines 72 and 73, "II-cyclooctatrienylnickelacetonate" should read -- II-cyclooctatrienylnickelacetylacetonate --. Column 4, line 32, "c" should read -- C --.

Signed and sealed this 20th day of April 1971.

(SEAL)
Attest:

EDWARD M. FLETCHER, JR.　　　　　　　WILLIAM E. SCHUYLER, JR.
Attesting Officer　　　　　　　　　　Commissioner of Patents